US012548265B2

(12) United States Patent
Chen et al.

(10) Patent No.: US 12,548,265 B2
(45) Date of Patent: Feb. 10, 2026

(54) TECHNIQUES FOR PERSISTENT CONTEXT STORAGE FOR AUGMENTED REALITY (AR) EFFECTS IN VIDEO SHARING PLATFORMS

(71) Applicant: Lemon Inc., Grand Cayman (KY)

(72) Inventors: Jing Jie Chen, Los Angeles, CA (US); Zihao Chen, Los Angeles, CA (US); Tianyang Xu, Los Angeles, CA (US); Siyao Yang, Los Angeles, CA (US); Jie Liao, Los Angeles, CA (US); Yixin Zhao, Culver City, CA (US); Diana Lee, Los Angeles, CA (US); Haiying Cheng, Culver City, CA (US); Weikai Li, Los Angeles, CA (US); Yi Yue, Culver City, CA (US)

(73) Assignee: LEMON INC., Grand Cayman (KY)

( * ) Notice: Subject to any disclaimer, the term of this patent is extended or adjusted under 35 U.S.C. 154(b) by 151 days.

(21) Appl. No.: 18/155,600

(22) Filed: Jan. 17, 2023

(65) Prior Publication Data

US 2023/0154124 A1 May 18, 2023

(51) Int. Cl.
*G06T 19/00* (2011.01)
*H04N 21/2743* (2011.01)

(52) U.S. Cl.
CPC ....... *G06T 19/006* (2013.01); *H04N 21/2743* (2013.01)

(58) Field of Classification Search
CPC ................................................. G06T 19/006
See application file for complete search history.

(56) References Cited

U.S. PATENT DOCUMENTS

| 10,360,708 | B2 * | 7/2019 | Bondich | G06V 40/172 |
| 2021/0165556 | A1 * | 6/2021 | Panse | G06F 3/167 |
| 2021/0304506 | A1 * | 9/2021 | Mourkogiannis | G06T 17/20 |
| 2021/0319625 | A1 * | 10/2021 | Goodrich | G06F 3/0482 |

* cited by examiner

*Primary Examiner* — Shivang I Patel
(74) *Attorney, Agent, or Firm* — Astute IP Law Group (57) ABSTRACT

Described are examples for providing augmented reality (AR) effects for a video sharing platform including activating, by a client of a video sharing platform, an AR effect for recording video for storing on the video sharing platform, and storing, by the client and on the video sharing platform, a user-specific context associated with the AR effect in an inventory that persists after the AR effect is deactivated, wherein the user-specific context includes an identifier of a user account associated with the user-specific context.

16 Claims, 6 Drawing Sheets

TECHNIQUES FOR PERSISTENT CONTEXT STORAGE FOR AUGMENTED REALITY (AR) EFFECTS IN VIDEO SHARING PLATFORMS

BACKGROUND

The described aspects relate to video sharing platforms, such as short video sharing platforms, and more particularly, augmented reality (AR) effects in video sharing platforms.

Video sharing platforms, which may also be referred to or otherwise include, short-form mobile video platforms, are widely used to allow people to share short videos in a social setting. Video sharing platforms can provide one or more servers that host or store videos uploaded by users for sharing with other users, and a client application that can be executed by user devices for capturing and sharing videos. For example, a video associated with an initiator user account can be captured via the client application executing on a user device and uploaded to the video sharing platform for at least temporary storage. The video sharing platform can allow other user devices associated with other user accounts to access the video uploaded by the initiator user account for viewing or adding social content, such as an emoticon, comment, etc. In this regard, users using the other user devices can view the video posted by the initiator user account and/or add social content thereto. In some examples, the video sharing platform can capture the video for live or nearly live streaming from the user device of the initiator user account to other user devices associated with other user accounts and/or facilitating live social content interaction.

In addition, some video sharing platforms provide selectable AR effects that can be added or overlaid onto videos captured by the user device. For example, the AR effects can be displayed on the video in a static coordinate position or in a dynamic coordinate position, such to move or modify with a moving object in the video. For example, an AR effect may include a mask overlaid on a detected face in the video, where the mask can move and be positioned on the face as the face moves in the video. Video sharing platforms can provide various selectable AR effects among which a user capturing a video to share can select to change the AR effect during a video being captured.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a computer-implemented method for providing augmented reality (AR) effects for a video sharing platform is provided that includes activating, by a client of a video sharing platform, an AR effect for recording video for storing on the video sharing platform, and storing, by the client and on the video sharing platform, a user-specific context associated with the AR effect in an inventory that persists after the AR effect is deactivated, wherein the user-specific context includes an identifier of a user account associated with the user-specific context.

In another example, an apparatus for providing augmented reality (AR) effects for a video sharing platform is provided that includes a processor and a non-transitory memory with instructions thereon. The instructions upon execution by the processor, cause the processor to activate, by a client of a video sharing platform, an AR effect for recording video for storing on the video sharing platform, and store, by the client and on the video sharing platform, a user-specific context associated with the AR effect in an inventory that persists after the AR effect is deactivated, wherein the user-specific context includes an identifier of a user account associated with the user-specific context.

In another example, a non-transitory computer-readable storage medium storing instructions that when executed by a processor cause the processor to execute a method is provided. The method includes activating, by a client of a video sharing platform, an AR effect for recording video for storing on the video sharing platform, and storing, by the client and on the video sharing platform, a user-specific context associated with the AR effect in an inventory that persists after the AR effect is deactivated, wherein the user-specific context includes an identifier of a user account associated with the user-specific context.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing a persistent storage of context for AR effects in video sharing platforms. For example, in video sharing platforms, AR effects are typically associated with a session, where activating an AR effect starts the session, and deactivating the AR effect ends the session. Conventionally, no content or data is maintained after the AR effect is deactivated and/or the session ends. In other words, in conventional video sharing platforms, content or data generated from a single AR effect cannot be saved, such that if the AR effect is reloaded, content or data is reset, and users cannot continue the content creation in one AR effect session. Also, in conventional video sharing platforms, different effects are isolated in this regard, such that there are no inter-linking elements. Rather, the AR effects live in a temporary isolated lifespan defined by the beginning and ending of the session for the AR effect.

Aspects described herein relate to providing a persistent storage for context for AR effects to allow the AR effects to have a context (e.g., data) that persists outside of sessions for the AR effects. For example, an AR effect can have content from one session that can be stored for use, modification, etc. in another session, or can be used by another AR effect. In an example, the video sharing platform can receive and store context data for an AR effect for a given user account (e.g., by associating the context data with a user identifier (ID) associated with the user account). In this regard, when the user account activates an AR effect, the video sharing platform can obtain the context (e.g., the associated data), which can be used by a client application of the video sharing platform to present the AR effect (or a different AR effect) based on the context.

Providing persistent storage of context for AR effects, in this regard, can provide multiple benefits to users of a video sharing platform. For example, persistent storage of the context can motivate users to collect times by revisiting the AR effect multiple times and continue the AR effect experience, which may allow for improved AR effects, such as gameplay possibilities. In addition, for example, the persistent storage of the context can facilitate creation of complex world-setting and narratives with each item and the collection process, create linkage between different AR effects to enable engagement across AR effects. diversify user experience, enable the capability to store user-created content, make unique, customized AR content for each user, etc.

Figure 1:
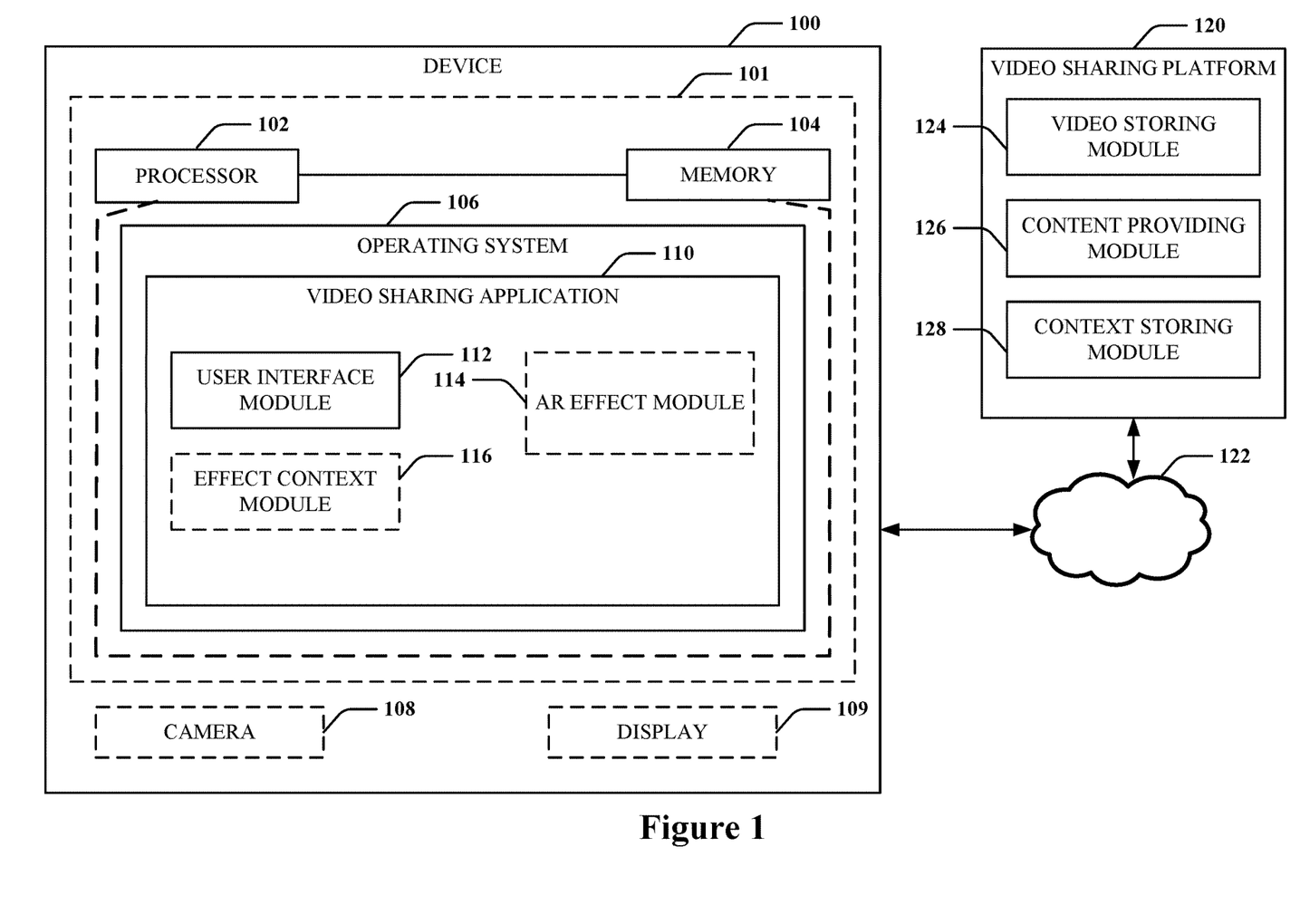
FIG. 1 is a schematic diagram of an example of a system for storing and/or retrieving a persistently-stored context associated with a user account for augmented reality (AR) effects in a video sharing application, in accordance with examples described herein.
Figure 2:
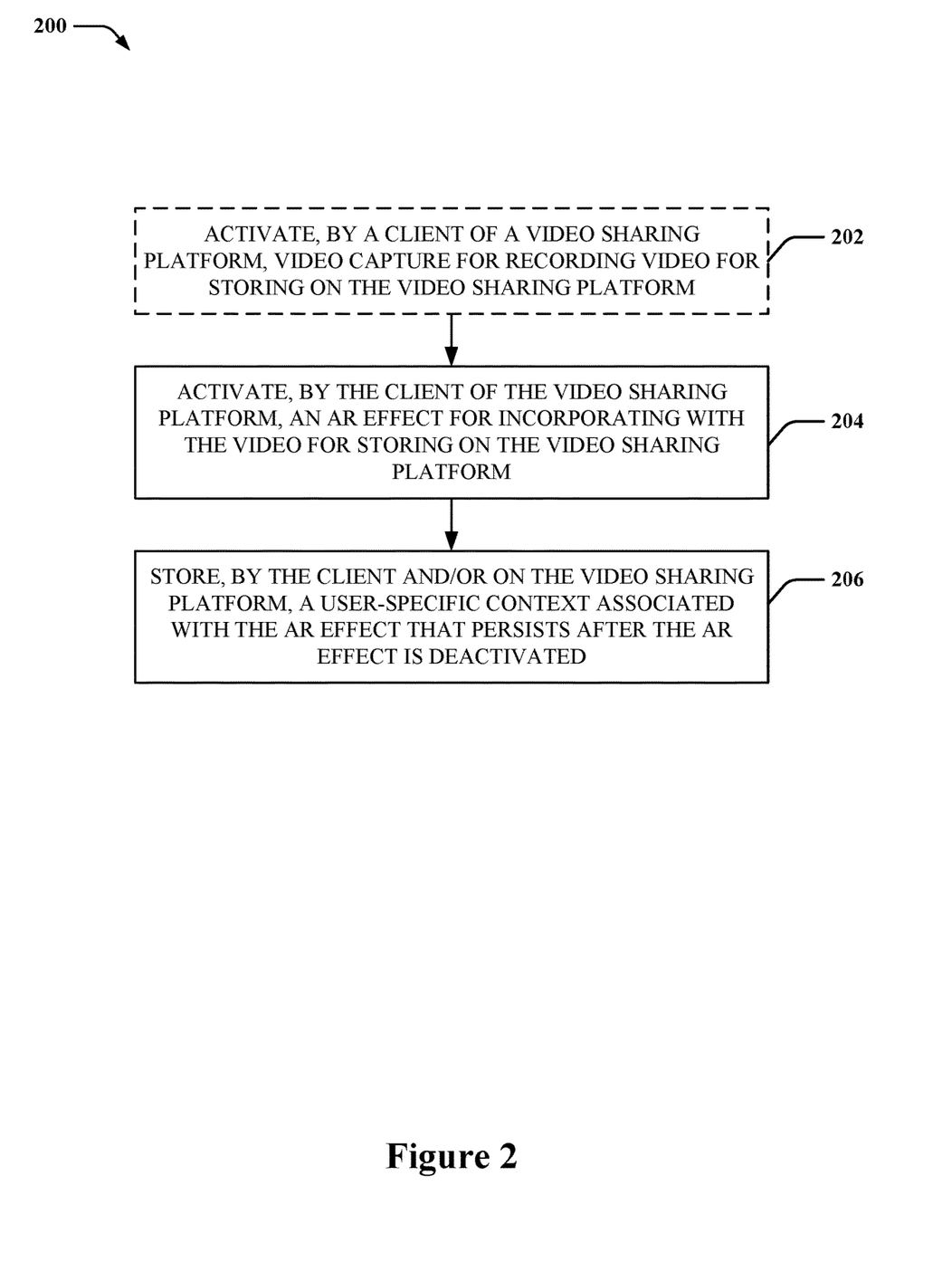
FIG. 2 is a flow diagram of an example of a method for maintaining a persistent storage of contexts for an AR effect, in accordance with examples described herein.
Figure 3:
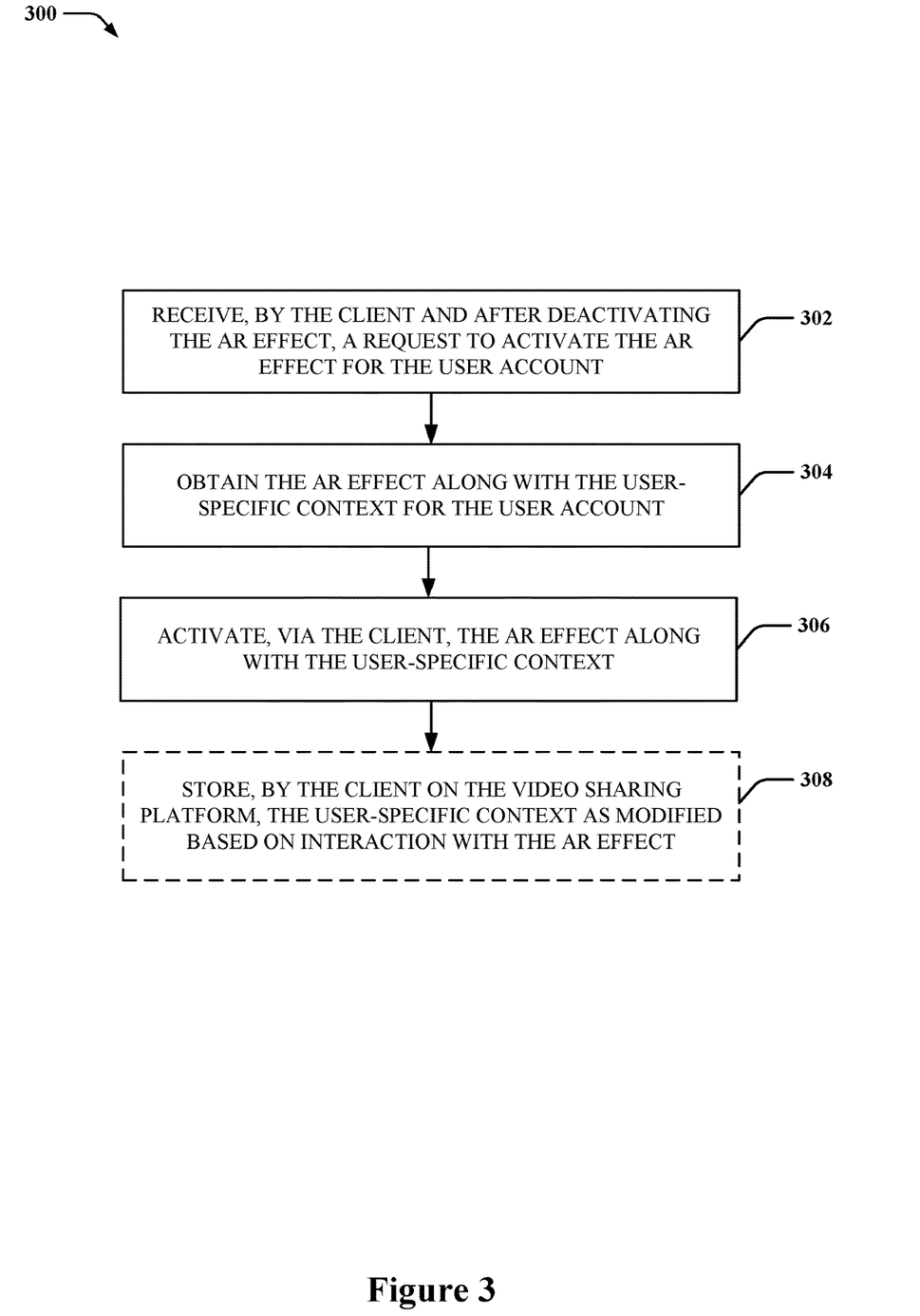
FIG. 3 is a flow diagram of an example of a method for obtaining a persistent storage of contexts for an AR effect, in accordance with examples described herein.
Figure 4:
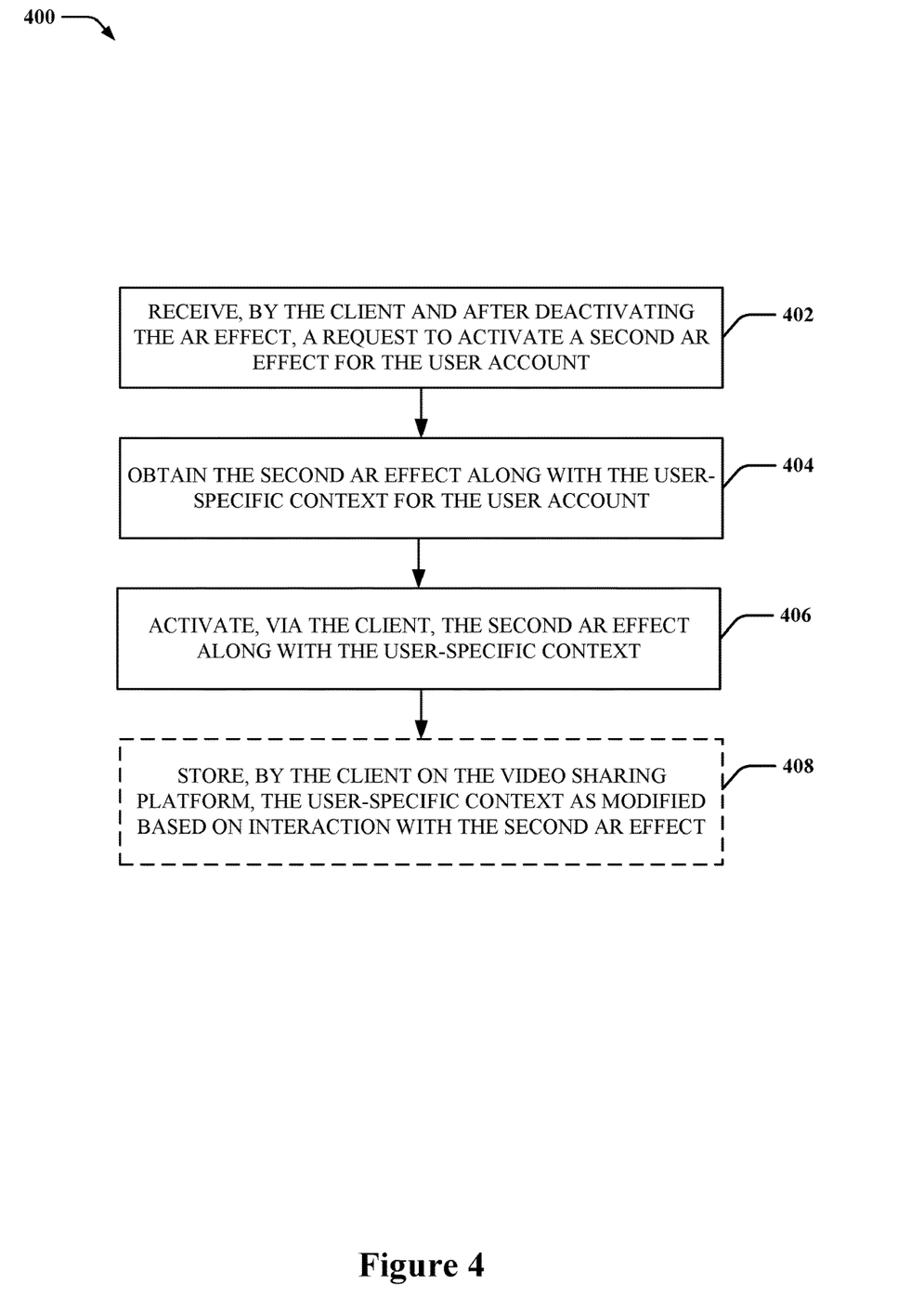
FIG. 4 is a flow diagram of an example of a method for obtaining a persistent storage of contexts for multiple AR effects, in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a system for storing and/or retrieving a persistently-stored context associated with a user account for augmented reality (AR) effects in a video sharing application. The system includes a device 100 (e.g., a computing device) that includes a processor 102 and/or memory 104. The device 100 can be configured to store and/or retrieve a persistently-stored context associated with a user account for AR effects in a video sharing application. In an example, device 100 can include a processor 102 and/or memory 104 configured to execute or store instructions or other parameters related to providing an operating system 106, which can execute one or more applications, services, etc. The one or more applications, services, etc. may include video sharing application 110 for sharing videos with other devices via a video sharing platform. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In addition, the device 100 can include substantially any device that can have a processor 102 and memory 104, such as a computer (e.g., workstation, server, personal computer, etc.), a personal device (e.g., cellular phone, such as a smart phone, tablet, etc.), a smart device, such as a smart television, and/or the like. Moreover, in an example, various components or modules of the device 100 may be within a single device, as shown, or distributed to different devices that are communicatively coupled with one another (e.g., in a network). In addition, the device 100 may optionally include a camera 108 (or multiple cameras) for capturing the video to be shared via video sharing application 110.

Video sharing application 110 can include a user interface module 112 for generating user interfaces for output to a display 109, which can accept input interactions from a user, such as activation or deactivation of video recording for recording or pausing/stopping recording of video via camera 108, selection of an AR effect to apply to the video being recorded, etc. In addition, user interface module 112 can output to a display 109 of the device 100, such as output the video being recorded, AR effects being applied to the video, a button that facilitates interaction to record or stop recording video, the selectable AR effect options, etc. In addition, in an example, video sharing application 110 can optionally include an AR effect module 114 for loading one or more AR effects and/or overlaying the AR effect over a video displayed on display 109, etc., and/or an effect context module 116 for obtaining a context for an AR effect from a persistent storage of contexts associated with a user account using the video sharing application 110.

In an example, video sharing application 110 can communicate with a video sharing platform 120 via a network 122 to store videos generated by video sharing application 110, to define access profiles for videos to allow other users/devices using the video sharing platform 120 to view the videos generated by video sharing application 110 or otherwise stored by a user account associated with the video sharing application 110 and/or video sharing platform 120, etc. In this regard, for example, video sharing platform 120 can include a video storing module 124 for storing videos received from the video sharing application 110 and/or other video sharing applications, and/or a content providing module 126 for providing video content stored on the video sharing platform 120 to other devices/users via a video sharing application 110 executing on the other devices. The video sharing platform 120 can manage access to the content based on parameters that can be specified by the video sharing application 110 or associated user account that authored the video. For example, video sharing platform 120 can allow access to all users of the video sharing platform 120, to a subset of users, which may be part of a defined group, etc. For example, the user account that authored the video can manage a group of "connections" or other classifications of other user accounts on the video sharing platform 120 for managing access to one or more videos authored by the user account.

In one example, video sharing platform 120 may also include a context storing module 128 for storing a context for one or more AR effects in a persistent storage of contexts for a user account. For example, context storing module 128 can store the context for the AR effect for a given user account to allow modifications to an AR effect to persist among sessions of using the AR effect, to persist across multiple AR effects, and/or the like. Storing the context, in this regard, can facilitate continued use of the AR effect for allowing gameplay features of the AR effect, can promote use of certain AR effects that have stored contexts, etc.

FIG. 2 is a flowchart of an example of a method 200 for maintaining a persistent storage of contexts for an AR effect. For example, method 200 can be performed by a device 100 and/or one or more components thereof for maintaining a persistent storage of contexts for AR effects.

In method 200, optionally at action 202, video capture for recording video for storing on a video sharing platform can be activated by a client of the video sharing platform. In an example, user interface module 112, e.g., in conjunction with processor 102, memory 104, operating system 106, video sharing application 110, etc., can activate, by the client (e.g., video sharing application 110) of the video sharing platform (e.g., video sharing platform 120), video capture for recording video (e.g., via camera 108) for storing on the video sharing platform. For example, a user using or otherwise interacting with the user interface module 112 can activate the video capture by interacting with (e.g., pressing) a camera record button (e.g., on a touch screen interface of the display 109 of device 100), gesturing a video capture command to the camera 108 (or another camera) on the device 100, etc. In an example, the camera 108 can begin capturing video, and device 100 can display the video as captured on display 109.

In method 200, at action 204, an AR effect for incorporating with the video for storing on the video sharing platform can be activated by a client of the video sharing platform. In an example, AR effect module 114, e.g., in conjunction with processor 102, memory 104, operating system 106, video sharing application 110, etc., can activate, by the client (e.g., video sharing application 110) of the video sharing platform (e.g., video sharing platform 120), the AR effect for incorporating with the video for storing on the video sharing platform. For example, the AR effect can be substantially any developed effect that can be overlayed over the video as captured by the camera 108 and/or presented on the display 109. In an example, AR effect module 114 can obtain the AR effect from a library of AR effects stored on the device 100 (e.g., stored by video sharing application 110) based on interaction with the user interface module 112 resulting in selection of the AR effect.

In an example, the AR effect may be statically positioned over the video or may be dynamically positioned, such as attached to one or more anchor points. For example, a statically positioned AR effect may include a background object (e.g., a tree) that can remain at a position despite other movement in the video (e.g., despite movement of a person in the video). For example, a dynamically positioned AR effect may be overlayed on a detected feature of the video, such as a face of a person. For example, the AR effect may modify the face of the person (e.g., accentuate pixels detected to be the face of the person) or place an object over the face of the person (e.g., a mask over pixels detected to be the face of the person). In this example, the dynamically positioned AR effect may move as the face of the person moves in the video.

In addition, in some examples, AR effects can be interacted with via user interface module 112, where interaction may change a property or functionality of the AR effect. For example, touching a mask may change a color or other property of the mask as overlayed on the video. Moreover, for example, interaction with AR effects can facilitate AR effects having gameplay features. For example, an AR effect may include a hand with which a user can interact to play games, such as rock, paper, scissors, where the hand is overlayed on video and can be stored with the video in the video sharing platform 120 for viewing by other users. In addition, playing games via the AR effect may result in rewards or other inventory items for use in another gameplay session or with other AR effects. For example, winning games against the hand may yield reward stones of which inventory can be persisted to allow the user to collect additional stones in subsequent game sessions (e.g., different levels of stones), display the stones in the inventory via another AR effect that can be overlayed on another (or the same) video for storing on video sharing platform 120, etc.

In method 200, at action 206, a user-specific context associated with the AR effect can be stored, by the client and on the video sharing platform, that persists after the AR effect is deactivated. In an example, effect context module 116, e.g., in conjunction with processor 102, memory 104, operating system 106, video sharing application 110, etc., can store, by the client (e.g., video sharing application 110) and/or on the video sharing platform (e.g., video sharing platform 120), the user-specific context associated with the AR effect that persists after the AR effect is deactivated. For example, effect context module 116 can store one or more parameters related to the user-specific context associated with the AR effect along with an identifier of the user account. In an example, the one or more parameters can include a status associated with the AR effect, a modification made to the AR effect, etc. In an example, effect context module 116 can store the one or more parameters as modifications are made while the AR effect is activated, which can include storing the one or more parameters locally for uploading to the video sharing platform 120 after AR effect deactivation or storing modifications to the one or more parameters to the video sharing platform 120 as modifications are made via interaction with the AR effect. In either case, for example, context storing module 128 can receive and store the one or more parameters, the associated user-specific context, etc., for subsequent retrieval when activating a next session of the AR effect or another AR effect. As described, context storing module 128 can store the user-specific context and/or associated parameters along with an identifier of the user account to facilitate subsequent retrieval thereof for the user using the video sharing application 110 to record video or otherwise activate and/or interact with the corresponding AR effect.

In one specific example, the one or more parameters can correspond to inventory items related to the AR effect (e.g., stones obtained via an AR effect), such as a list of numbers where each number corresponds to an item of inventory that can be obtained via the AR effect. In this example, each number can correspond to a unique pre-designed item, where each item can have a unique model, texture, rarity ranking, and detailed description, etc. For example, effect context module 116 can store an indication of items acquired via the AR effect in the inventory by storing an associated number in an inventory associated with the user account stored on the video sharing platform 120. In another specific example, the one or more parameters can correspond to a state associated with the AR effect. For example, the AR effect can be a plant or other being that can grow based on time or number of AR effect session activations. In this example, effect context module 116 can store a time at which an initial instance of the AR effect is activated or can store an incrementable parameter that is incremented each time the AR effect is activated. Based on the value of the parameter, the AR effect can be presented in a different state at each AR effect session activation.

FIG. 3 is a flowchart of an example of a method 300 for obtaining a persistent storage of contexts for an AR effect. For example, method 300 can be performed by a device 100 and/or one or more components thereof for obtaining a persistent storage of contexts for AR effects.

In method 300, at action 302, a request to activate the AR effect for the user account can be received by the client and after deactivating the AR effect. In an example, user interface module 112, e.g., in conjunction with processor 102, memory 104, operating system 106, video sharing application 110, etc., can receive, by the client (e.g., video sharing application 110) and after deactivating the AR effect, a request to activate the AR effect for the use account. For example, this may include activating the video capture and the AR effect, as described in method 200 above, where the user-specific context can be stored before or otherwise based on the AR effect being deactivated (e.g., where deactivation can occur via interaction with user interface module 112). In accordance with aspects described herein, a context of one or more parameters can be stored for the AR effect to persist among sessions.

In method 300, at action 304, the AR effect can be obtained along with the user-specific context for the user account. In an example, AR effect module 114 and/or effect context module 116, e.g., in conjunction with processor 102, memory 104, operating system 106, video sharing application 110, etc., can obtain the AR effect along with the user-specific context for the user account. For example, AR effect module 114 can obtain the AR effect from a library of AR effects for overlaying on a video being capture via camera 108 and/or displayed on display 109, as described. In addition, effect context module 116 can obtain the user-specific context associated with the user account and/or the AR effect. For example, effect context module 116 may determine that the obtained AR effect may be associated with a user-specific context (e.g., based on a property of the AR effect), and effect context module 116 may query the video sharing platform 120 (e.g., the context storing module 128) for a context for the AR effect. For example, effect context module 116 may provide an identifier associated with the user account in requesting the user-specific context. In an example, context storing module 128 can use the identifier to obtain the user-specific context of the AR effect that is stored for the user account, as described above.

In one specific example, as described, the user-specific context can include an inventory of items related to the AR effect that the user may have collected in using the AR effect. In this example, the user-specific context may include a list of numbers, where each number indicates an items, as described above. This can allow the AR effect to display the items in the inventory based on the list of numbers that are stored for the user account (e.g., based on the user account identifier). In another specific example, the user-specific context may include a incrementable value or timestamp indicating a life value for an AR effect, and this value can be used in representing the AR effect. In one example, effect context module 116 can query the video sharing platform 120 (e.g., context storing module 128) using the user account identifier and/or an identifier of one or more AR effects, to request contents created by the same user in an AR effect or across different AR effects. In another example, effect context module 116 can query the video sharing platform 120 (e.g., context storing module 128) using a target identifier of a cloud recognition target to obtain the specific context for representing the AR effect.

In method 300, at action 306, the AR effect can be activated, via the client, along with the user-specific context. In an example, AR effect module 114, e.g., in conjunction with processor 102, memory 104, operating system 106, video sharing application 110, etc., can activate, via the client (e.g., video sharing application 110), the AR effect along with the user-specific context. For example, AR effect module 114 can activate the AR effect by overlaying the AR effect on video being captured via camera 108 and/or displayed on display 109, as described above. In an example, AR effect module 114 can activate the AR effect based on or using the user-specific context.

For example, where the one or more parameters include an inventory of items, AR effect module 114 can activate the AR effect to include (e.g., display) the inventory of items. In this example, where the user-specific context includes a list of numbers each corresponding to an inventory item, AR effect module 114 can display and render the corresponding items in the inventory user interface of the AR effect. For example, where the one or more parameters include a timestamp or incrementable value, AR effect module 114 can render the AR effect to show a progress of the AR effect based on the timestamp or incrementable value. For example, the AR effect can be a plant or other being, and AR effect module 114 can render the plant at a height or bloom level that is based on a difference between the timestamp and a current time, based on the incrementable value that increments each time the AR effect is activated, etc.

In method 300, optionally at action 308, the user-specific context as modified based on interaction with the AR effect can be stored by the client on the video sharing platform. In an example, effect context module 116, e.g., in conjunction with processor 102, memory 104, operating system 106, video sharing application 110, etc., can store, by the client (e.g., video sharing application 110) and/or on the video sharing platform (e.g., video sharing platform 120), the user-specific context as modified based on interaction with the AR effect. For example, effect context module 116 can store one or more parameters related to the user-specific context associated with the AR effect, and as modified, along with an identifier of the user account. In an example, the one or more parameters can include a status associated with the AR effect, a modification made to the AR effect, etc. In an example, effect context module 116 can store the one or more parameters as modifications are made while the AR effect is activated, which can include storing the one or more parameters locally for uploading to the video sharing platform 120 after AR effect deactivation or storing modifications to the one or more parameters to the video sharing platform 120 as modifications are made via interaction with the AR effect. In either case, for example, context storing module 128 can receive and store the one or more parameters, the associated user-specific context, etc., for subsequent retrieval when activating a next session of the AR effect or another AR effect.

In a specific example, such as where the AR effect provides a gameplay functionality, When a user discovers a new item through gameplay, the new item can be added to the inventory, which may include storing an indicator of the item (e.g., a number) in the user-specific context. In an example, effect context module 116 and/or context storing module 128 can compare a corresponding index number of the newly added items to a current list of items in the inventory stored as the user-specific context for the AR effect to determine if it is a new item. If it is, effect context module 116 can store the item in the inventory, which may include issuing a hyper-text transfer protocol (HTTP) request to the video sharing platform 120 to replace the user-specific context with an updated list, for the specific user account identifier, that includes the number of the new inventory item. In this regard, the inventory can persist among sessions of the AR effect (e.g., among activations and deactivations of the AR effects in the same or over different videos captured by the user).

FIG. 4 is a flowchart of an example of a method 400 for obtaining a persistent storage of contexts for multiple AR effects. For example, method 400 can be performed by a device 100 and/or one or more components thereof for obtaining a persistent storage of contexts for AR effects. The actions described for method 400 can be similar to those described for method 300 but for a second AR effect that can be activated to use the user-specific context stored by a different AR effect.

In method 400, at action 402, a request to activate the second AR effect for the user account can be received by the client and after deactivating the AR effect. In an example, user interface module 112, e.g., in conjunction with processor 102, memory 104, operating system 106, video sharing application 110, etc., can receive, by the client (e.g., video sharing application 110) and after deactivating the AR effect, a request to activate the second AR effect for the use account. For example, this may include activating the video capture and the second AR effect, as described in method 200 above, where the user-specific context can be stored before or otherwise based on the AR effect (an initial or first AR effect) being deactivated (e.g., where deactivation can occur via interaction with user interface module 112). In accordance with aspects described herein, a context of one or more parameters can be stored for the AR effect to persist among AR effects.

In method 400, at action 404, the second AR effect can be obtained along with the user-specific context for the user account. In an example, AR effect module 114 and/or effect context module 116, e.g., in conjunction with processor 102, memory 104, operating system 106, video sharing application 110, etc., can obtain the second AR effect along with the user-specific context for the user account. For example, AR effect module 114 can obtain the second AR effect from a library of AR effects for overlaying on a video being capture via camera 108 and/or displayed on display 109, as described. In addition, effect context module 116 can obtain the user-specific context associated with the user account and/or the AR effect. For example, the user-specific context can be associated with the initial or original AR effect that stored the user-specific context and/or can also be associated with the second AR effect at the time of storing the context. For example, effect context module 116 may determine that the obtained second AR effect may also be associated with a user-specific context (e.g., based on a property of the second AR effect), and effect context module 116 may query the video sharing platform 120 (e.g., the context storing module 128) for a context for the AR effect. For example, effect context module 116 may provide an identifier associated with the user account in requesting the user-specific context. In an example, context storing module 128 can use the identifier to obtain the user-specific context of the AR effect (and/or second AR effect) that is stored for the user account, as described above.

In method 400, at action 406, the second AR effect can be activated, via the client, along with the user-specific context. In an example, AR effect module 114, e.g., in conjunction with processor 102, memory 104, operating system 106, video sharing application 110, etc., can activate, via the client (e.g., video sharing application 110), the second AR effect along with the user-specific context. For example, AR effect module 114 can activate the second AR effect by overlaying the second AR effect on video being captured via camera 108 and/or displayed on display 109, as described above. In an example, AR effect module 114 can activate the second AR effect based on or using the user-specific context that persists from the initial or first AR effect.

In method 400, optionally at action 408, the user-specific context as modified based on interaction with the second AR effect can be stored by the client on the video sharing platform. In an example, effect context module 116, e.g., in conjunction with processor 102, memory 104, operating system 106, video sharing application 110, etc., can store, by the client (e.g., video sharing application 110) and/or on the video sharing platform (e.g., video sharing platform 120), the user-specific context as modified based on interaction with the second AR effect. For example, effect context module 116 can store one or more parameters related to the user-specific context associated with the second AR effect, and as modified, along with an identifier of the user account. In an example, the one or more parameters can include a status associated with the second AR effect, a modification made to the second AR effect, etc. In an example, effect context module 116 can store the one or more parameters as modifications are made while the second AR effect is activated, which can include storing the one or more parameters locally for uploading to the video sharing platform 120 after second AR effect deactivation or storing modifications to the one or more parameters to the video sharing platform 120 as modifications are made via interaction with the second AR effect. In either case, for example, context storing module 128 can receive and store the one or more parameters, the associated user-specific context, etc., for subsequent retrieval when activating a next session of the second AR effect or another AR effect.

In examples described above and herein, a cross-effects inventory system is provided where users can collect items through gameplay, and then keep their items collection progress persistently after each session, as well as cross different effects that have the same inventory system. When users enter the effect, a request for user identifier can be used, and based on the user identifier, a backend AR content platform can be queried for the inventory items stored under this user identifier. Whenever user collects a new item, or made changes to the inventory, the items can be synchronized to the collection list with backend server through HTTP requests to keep the inventory updated. When users open another effect with the same inventory system integrated, the server can be queried with the same address and user identifier to get the most updated inventory items list, as described herein. Assets such as related images/models/texts of all possibly collectible items can be already stored in the effect package and indexed by a number. The online inventory list can accordingly store a list of numbers, each corresponding to an item, with unique graphics, rarity and/or description.

Figure 5:
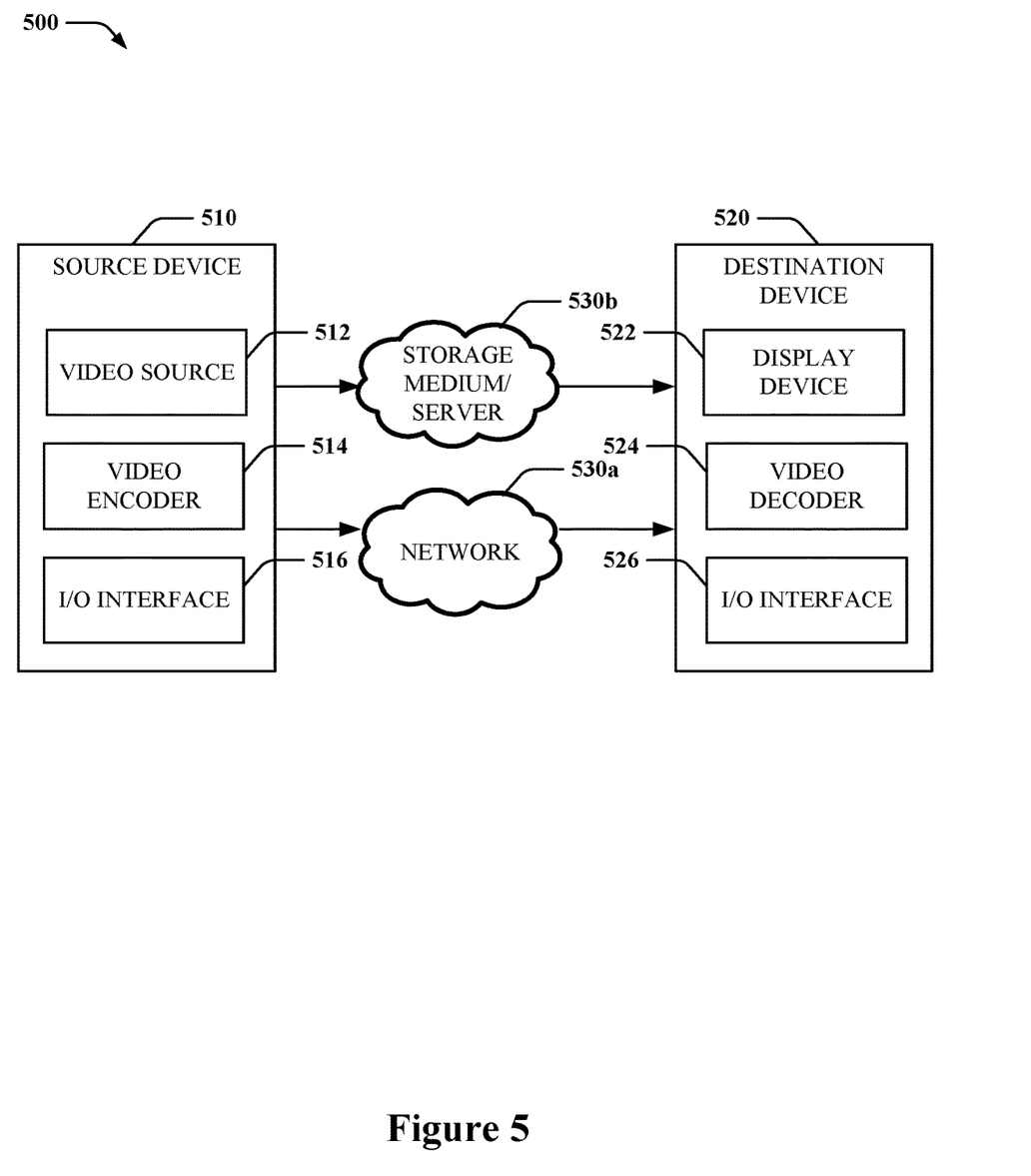
FIG. 5 is a block diagram that illustrates an example of a video coding system, in accordance with examples described herein.

FIG. 5 is a block diagram that illustrates an example of a video coding system 500 that may utilize the techniques described herein.

As shown in FIG. 5, video coding system 500 may include a source device 510 and a destination device 520. Source device 510 generates encoded video data which may be referred to as a video encoding device. Destination device 520 may decode the encoded video data generated by source device 510 which may be referred to as a video decoding device.

Source device 510 may include a video source 512, a video encoder 514, and an input/output (I/O) interface 516.

Video source 512 may include a source such as a video capture device (e.g., camera 108), an interface to receive video data from a video content provider, and/or a computer graphics system for generating video data, or a combination of such sources. The video data may comprise one or more pictures. Video encoder 514 encodes the video data from video source 512 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 516 may include a modulator/demodulator (modem) and/or a transmitter. The encoded video data may be transmitted directly to destination device 520 via I/O interface 516 through network 530a. The encoded video data may also be stored onto a storage medium/server 530b for access by destination device 520.

Destination device 520 may include an I/O interface 526, a video decoder 524, and a display device 522.

I/O interface 526 may include a receiver and/or a modem. I/O interface 526 may acquire encoded video data from the source device 510 or the storage medium/server 530b. Video decoder 524 may decode the encoded video data. Display device 522 may display the decoded video data to a user. Display device 522 may be integrated with the destination device 520, or may be external to destination device 520 which be configured to interface with an external display device.

Video encoder 514 and video decoder 524 may operate according to a video compression standard, such as the High Efficiency Video Coding (HEVC) standard, Versatile Video Coding (VVM) standard and other current and/or further standards.

In one example, source device 510 and/or destination device 520 can be similar to device 100, as described above. In an example, storage medium/server 530b may include a video sharing platform 120, as described above. In an example, video source 512 can include camera 108 that source device (e.g., as device 100) can use to capture video and/or overlay AR effects. Display device 522 can include a display 109 that destination device 520 (e.g., as device 100) can use to display video authored by another device and stored on the video storage platform.

Figure 6:
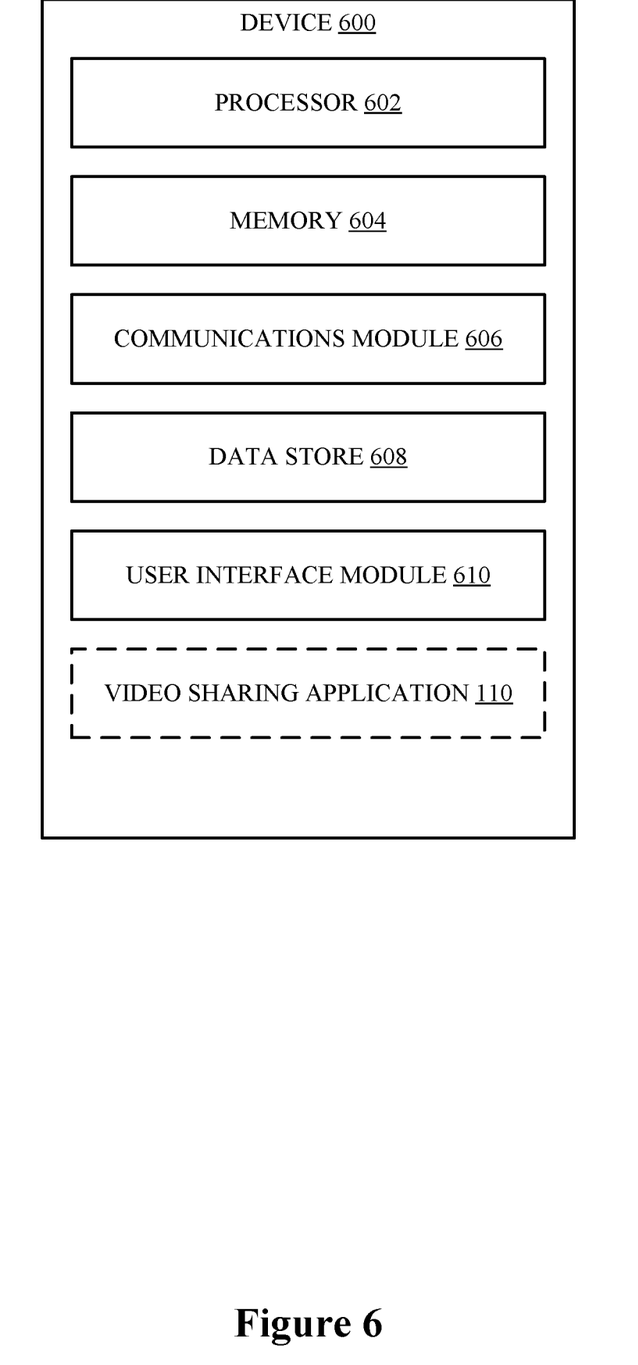
FIG. 6 is a schematic diagram of an example of a device for performing functions described herein.

FIG. 6 illustrates an example of device 600, similar to or the same as device 100 (FIG. 1), including additional optional component details as those shown in FIG. 1. In one implementation, device 600 may include processor 602, which may be similar to processor 102 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 104 such as for storing local versions of applications being executed by processor 602, such as video sharing application 110, related modules, instructions, parameters, etc. Memory 604 can include a type of memory usable by a computer, such as random access memory (RAM), read only memory (ROM), tapes, magnetic discs, optical discs, volatile memory, non-volatile memory, and any combination thereof Further, device 600 may include a communications module 606 that provides for establishing and maintaining communications with one or more other devices, parties, entities, etc., utilizing hardware, software, and services as described herein. Communications module 606 may carry communications between modules on device 600, as well as between device 600 and external devices, such as devices located across a communications network and/or devices serially or locally connected to device 600. For example, communications module 606 may include one or more buses, and may further include transmit chain modules and receive chain modules associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with implementations described herein. For example, data store 608 may be or may include a data repository for applications and/or related parameters (e.g., video sharing application 110, related modules, instructions, parameters, etc.) not currently being executed by processor 602. In addition, data store 608 may be a data repository for video sharing application 110, related modules, instructions, parameters, etc., and/or one or more other modules of the device 600.

Device 600 may include a user interface module 610 operable to receive inputs from a user of device 600 and further operable to generate outputs for presentation to the user. User interface module 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 610 may include one or more output devices, including but not limited to a display, a speaker, a haptic feedback mechanism, a printer, any other mechanism capable of presenting an output to a user, or any combination thereof. User interface module 610 may include or may communicate with user interface module 112 to allow input via user interface module 112, or receive output via user interface module 112 for displaying, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for providing augmented reality (AR) effects for a video sharing platform, comprising:
    activating, by a user account of a client of a video sharing platform, an AR effect for recording video for storing on the video sharing platform;
    storing, by the client and in an inventory on the video sharing platform, a user-specific context of the user account that activated the AR effect that persists within the inventory after the AR effect is deactivated, wherein the user-specific context includes an identifier of the user account and one or more inventory items collected during interaction with the AR effect;
    receiving, by the client, and after deactivating the AR effect, a request to activate the AR effect for subsequent interaction from the user account;
    obtaining the AR effect along with the user-specific context for the user account from the inventory;
    providing, via the client, the AR effect along with the user-specific context; and
    storing, by the client in the inventory on the video sharing platform, the user-specific context as modified based on the interaction with the AR effect including one or more additional inventory items collected during the subsequent interaction with the AR effect.

2. The computer-implemented method of claim 1, wherein the user-specific context includes one or more parameters related to activating the AR effect or a different AR effect after deactivating the AR effect.

3. The computer-implemented method of claim 1, wherein the user-specific context includes one or more items collected via a different AR effect.

4. The computer-implemented method of claim 1, wherein the user-specific context includes a timestamp related to activating the AR effect.

5. The computer-implemented method of claim 1, further comprising:
    receiving, by the client and after deactivating the AR effect, a request to activate a second AR effect for the user account;
    obtaining the second AR effect along with the user-specific context that is associated with the AR effect for the user account from the inventory; and
    providing, via the client, the second AR effect along with the user-specific context.

6. An apparatus for providing augmented reality (AR) effects for a video sharing platform, the apparatus comprising a processor and a non-transitory memory with instructions thereon, wherein the instructions upon execution by the processor, cause the processor to:
    activate, by a user account of a client of a video sharing platform, an AR effect for recording video for storing on the video sharing platform;
    store, by the client and in an inventory on the video sharing platform, a user-specific context of the user account that activated the AR effect that persists within the inventory after the AR effect is deactivated, wherein the user-specific context includes an identifier of the user account associated and one or more inventory items collected during interaction with the AR effect;
    receive, by the client and after deactivating the AR effect, a request to activate the AR effect for subsequent interaction from the user account;
    obtain the AR effect along with the user-specific context for the user account from the inventory;
    provide, via the client, the AR effect along with the user-specific context; and
    store, by the client in the inventory on the video sharing platform, the user-specific context as modified based on the interaction with the AR effect including one or more additional inventory items collected during the subsequent interaction with the AR effect.

7. The apparatus of claim 6, wherein the user-specific context includes one or more parameters related to activating the AR effect or a different AR effect after deactivating the AR effect.

8. The apparatus of claim 6, wherein the user-specific context includes one or more items collected via a different AR effect.

9. The apparatus of claim 6, wherein the user-specific context includes a timestamp related to activating the AR effect.

10. The apparatus of claim 6, wherein the instructions upon execution by the processor, cause the processor to:
- receive, by the client and after deactivating the AR effect, a request to activate a second AR effect for the user account;
- obtain the second AR effect along with the user-specific context that is associated with the AR effect for the user account from the inventory; and
- provide, via the client, the second AR effect along with the user-specific context.

11. The apparatus of claim 6, wherein the user-specific context includes a timestamp related to activating the AR effect.

12. A non-transitory computer-readable storage medium storing instructions that when executed by a processor cause the processor to execute a method, wherein the method comprises:
- activating, by a user account of a client of a video sharing platform, an AR effect for recording video for storing on the video sharing platform;
- storing, by the client and in an inventory on the video sharing platform, a user-specific context of the user account that activated the AR effect that persists within the inventory after the AR effect is deactivated, wherein the user-specific context includes an identifier of the user account and one or more inventory items collected during interaction with the AR effect;
- receiving, by the client and after deactivating the AR effect, a request to activate the AR effect for subsequent interaction from the user account;
- obtaining the AR effect along with the user-specific context for the user account from the inventory;
- providing, via the client, the AR effect along with the user-specific context; and
- storing, by the client in the inventory on the video sharing platform, the user-specific context as modified based on the interaction with the AR effect including one or more additional inventory items collected during the subsequent interaction with the AR effect.

13. The non-transitory computer-readable storage medium of claim 12, wherein the user-specific context includes one or more parameters related to activating the AR effect or a different AR effect after deactivating the AR effect.

14. The non-transitory computer-readable storage medium of claim 12, wherein the user-specific context includes one or more items collected via a different AR effect.

15. The non-transitory computer-readable storage medium of claim 12, wherein the user-specific context includes a timestamp related to activating the AR effect.

16. The non-transitory computer-readable storage medium of claim 12, the method further comprising:
- receiving, by the client and after deactivating the AR effect, a request to activate a second AR effect for the user account;
- obtaining the second AR effect along with the user-specific context that is associated with the AR effect for the user account from the inventory; and
- providing, via the client, the second AR effect along with the user-specific context.

* * * * *